Patented July 23, 1935

2,008,723

UNITED STATES PATENT OFFICE 2,008,723

PROCESS OF PREPARING ABRASIVE OR POLISHING TOOLS

Harry P. Mills, Toronto, Ontario, Canada, assignor to Bakelite Corporation, New York, N. Y., a corporation of Delaware No Drawing. Application April 26, 1932, Serial No. 607,674. In Germany May 13, 1931

6 Claims. (Cl. 51—280)

The invention relates to processes for the manufacture of grinding or polishing tools from abrasive grains, as for example emery, or crystalline substances containing alumina, by employing phenol-aldehyde resins as binder and the articles so obtained.

It is known that abrasive or polishing tools from such ingredients are made by mixing heat-hardenable phenol-aldehyde resins, which as intermediate products of the condensation of stoichiometric mixtures of phenols and aldehydes are almost free from uncombined phenols and at ordinary temperature are hard and brittle bodies, with solvents or swelling agents of comparatively high boiling points to obtain the plasticity and flow necessary for cold molding. For this purpose there can be used for example high-boiling aldehydes, such as furfural, benzaldehydes, caproic aldehyde, iso-hexylaldehyde, mannoheptose, methyl furfural and the like which are added to the phenol resins in suitable quantity proportions. A phenol resin having an addition of a solvent or swelling agent as specified is mixed with the abrasive grains, preferably with further additions, the result being a composition suitable for cold molding in the usual manner into grinding wheels or the like and then heat-hardened. This well-known process results in grinding or polishing tools of great strength. It has, however, the disadvantage that in carrying out the process, an addition of furfural or other solvent or swelling agent is required in the comparatively large quantities of approximately 30 to 50 parts by weight calculated on the resin. It has been further proposed that in the manufacture of grinding or polishing tools there be used as plasticizers for phenol-aldehyde resins which are solid at ordinary temperature and comparatively high melting, liquid phenol-aldehyde resins, i. e. products which are not fully condensed and which at ordinary temperature are liquid and, because of incomplete condensation, contain a large percentage of a free phenol (phenol, cresol, etc.) and incompletely condensed resinlike products. Liquid phenol-aldehyde resins of this character as plasticizers have the inherent disadvantage that, because of the high vapor pressure of the free phenols, loss in these ingredients occurs during hardening by heating, particularly at the surfaces of the grinding or abrasive tools; this is known to result in defects in the surfaces of molded and hardened articles as well as in material shrinkages which causes changes in the dimensions during heating.

According to the present invention, disadvantages of this nature can be avoided if, as plasticizers for heat-hardenable phenol-aldehyde resins which are solid at room temperature and have a comparatively high melting point, phenol-aldehyde resins are incorporated which are liquid at room temperature and in addition include such materials that combine with the free, or not fully combined, ingredients contained in the liquid phenol-aldehyde resins during a heat-hardening step to form compounds that are not volatile at the hardening temperature employed. One can for example proceed by moistening the abrasive grains with liquid phenol-resin and then mixing them with a mixture of solid phenol-resin and high boiling aldehydes until a mass is obtained which is quite uniform and suitable for cold-molding. For this purpose high-boiling aldehydes for example furfural, or the other above mentioned aldehydes or mixtures of these materials can be used to advantage. These substances are added to the solid phenol-resin in such a quantity at least that during the hardening process the free phenols and other uncombined ingredients of the liquid phenol resin are bound as completely as possible. An excess of the high-boiling aldehyde, however, can be used. In place of high boiling aldehydes, or in admixture with them, other materials for example hexamethylenetetramine, paraformaldehyde, or materials containing similar active methylene groups can be added to the solid phenol resin. Obviously the sequence of steps given in mixing the ingredients can be varied. The abrasive grains can be moistened with the high-boiling aldehydes, or mixtures thereof with hardening agents, and then a mixture of solid phenol resin and liquid phenol-resin can be added to the moistened abrasive grains. Or high-boiling aldehydes and other suitable hardening agents can be mixed and applied to the abrasive grains before or after mixing them with the solid phenol-resin. Plasticizers incorporated according to this invention, can therefore either be mixed with one another or with abrasive grains as well as with the solid phenol-resin, and the mixing of the various ingredients can follow any sequence desired.

*Example 1*

850 parts by weight of abrasive grains are uniformly mixed in a suitable device with 75 parts by weight of a liquid phenol-formaldehyde resin. The abrasive grains so moistened with the liquid phenol-resin are then mixed with 75 parts by weight of a solid heat-hardenable phenol-formaldehyde resin which is substantially free from free phenols or other uncombined ingredients and to which 18 parts by weight of furfural have been added. The composition obtained is molded by applying a pressure of 300 kilos per square centimeter at a temperature of 180°, and after removal from the mold the shaped article is hardened in an oven for three hours at 180° C.

*Example 2*

20 parts by weight of furfural are mixed with 8 parts by weight of hexamethylenetetramine; this mixture is used to moisten 880 parts by weight of abrasive grains. The moistened abrasive grains together with 80 parts by weight of solid phenol-formaldehyde resin are added to 60 parts by weight of a liquid phenol-formaldehyde resin and stirred until a uniform mass is obtained. The mass is molded cold and subsequently hardened by heat.

*Example 3*

80 parts by weight of solid phenol formaldehyde resin are mixed with 15 parts by weight of furfural, 10 parts by weight of paraformaldehyde and 120 parts by weight of liquid phenol formaldehyde resin. After mixing this mass with 800 parts of abrasive grains, one obtains a product suitable for cold-molding which is worked in the well-known manner for example into grinding wheels.

*Example 4*

900 parts by weight of abrasive grains are moistened with 60 parts by weight of a liquid phenol-formaldehyde resin, and mixed with 50 parts by weight of a solid phenol-formaldehyde resin containing 5 parts of paraformaldehyde until a uniform mass is formed. The mixture is further manipulated as in the previous examples.

As solid phenolic resins, there may also be used such intermediate condensation products which comprise a permanently fusible phenol resin and hexamethylenetetramine or another hardening agent containing active methylene groups. For the manufacture of abrasive or polishing tools, ingredients besides abrasive grains and resinlike binder, such as for example water-bonding bodies, dyes, fillers, or other suitable substances, can be included.

I claim:

1. Process of preparing abrasive or polishing implement which comprises moistening abrasive grains with a liquid phenol-aldehyde resin containing free phenol, mixing therewith a heat-hardenable phenol-aldehyde resin in solid powdered form and an agent for combining with the free phenol contained in the liquid resin to thereby form a composition suitable for cold molding and subsequent heat-hardening, molding the composition obtained by pressure, and subjecting the molded composition to heat to cause a combination between the free phenol and the agent and to harden the resin, thereby yielding an article free from surface defects and shrinkage due to volatilization of phenol.

2. Moldable composition suitable for cold molding and subsequent heat-hardening comprising abrasive grains coated with a liquid phenol-aldehyde resin containing free phenol in admixture with a powdered solid heat-hardenable phenol-aldehyde resin and an agent for combining with the free phenol contained in the liquid resin, said composition being convertible by heat into a hardened product free from surface defects and shrinkage due to volatilization of phenol.

3. Process of preparing an abrasive implement which comprises incorporating abrasive grains with a binder of a phenol-aldehyde resin in liquid form having an appreciable content of free phenol, a heat-hardenable phenol-aldehyde resin in solid form, and an agent for combining with the free phenol content to thereby form a composition suitable for cold molding and subsequent heat-hardening, molding the composition thus obtained by pressure, and subjecting the molded piece to heat to cause a combination of the free phenol and the agent and harden the resin, thereby yielding an article free from surface defects and shrinkage due to volatilization of phenol.

4. Process according to claim 3 in which the agent is an aldehyde.

5. Moldable composition suitable for cold molding and subsequent heat-hardening comprising abrasive grains incorporated with a binder of a phenol-aldehyde resin in liquid form having an appreciable content of free phenol, a heat-hardenable phenol-aldehyde resin in solid form, and an agent for combining with the free phenol content, said composition being convertible by heat into a hardened product free from surface defects and shrinkage due to volatilization of phenol.

6. Composition according to claim 5 in which the agent is an aldehyde.

HARRY P. MILLS.